United States Patent
Sugimoto

(10) Patent No.: US 7,884,874 B2
(45) Date of Patent: Feb. 8, 2011

(54) DIGITAL STILL CAMERA AND METHOD OF CONTROLLING SAME

(75) Inventor: Masahiko Sugimoto, Asaka (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 953 days.

(21) Appl. No.: 11/087,677

(22) Filed: Mar. 24, 2005

(65) Prior Publication Data

US 2005/0219395 A1 Oct. 6, 2005

(30) Foreign Application Priority Data

Mar. 31, 2004 (JP) ............................. 2004-101785

(51) Int. Cl.
H04N 5/222 (2006.01)
G06K 9/00 (2006.01)
G06K 9/18 (2006.01)

(52) U.S. Cl. ............................. 348/333.12; 348/333.02; 348/333.01; 382/115; 382/116; 382/117; 382/118; 382/181; 382/182

(58) Field of Classification Search ............ 348/333.01, 348/333.12; 382/115–118, 181, 182
See application file for complete search history.

(56) References Cited

U.S. PATENT DOCUMENTS

| 5,450,504 | A | * | 9/1995 | Calia .......................... 382/118 |
| 5,680,481 | A | * | 10/1997 | Prasad et al. ................. 382/190 |
| 6,035,074 | A | * | 3/2000 | Fujimoto et al. ............. 382/282 |
| 6,907,136 | B1 | * | 6/2005 | Shigemori ................... 382/118 |
| 6,931,661 | B2 | * | 8/2005 | Smith .......................... 725/133 |
| 6,940,545 | B1 | * | 9/2005 | Ray et al. ................ 348/222.1 |
| 7,155,037 | B2 | * | 12/2006 | Nagai et al. ................. 382/118 |
| 7,194,114 | B2 | * | 3/2007 | Schneiderman ............. 382/118 |
| 7,227,976 | B1 | * | 6/2007 | Jung et al. ................... 382/103 |
| 7,239,726 | B2 | * | 7/2007 | Li ............................... 382/118 |
| 7,274,832 | B2 | * | 9/2007 | Nicponski ................... 382/297 |
| 7,349,558 | B2 | * | 3/2008 | Enomoto ..................... 382/118 |
| 2002/0092029 | A1 | * | 7/2002 | Smith .......................... 725/105 |
| 2003/0108225 | A1 | * | 6/2003 | Li ............................... 382/118 |
| 2003/0160760 | A1 | * | 8/2003 | Takakura et al. ............. 345/158 |
| 2004/0202381 | A1 | * | 10/2004 | Kitajima ..................... 382/275 |

(Continued)

FOREIGN PATENT DOCUMENTS

JP 2003-107335 4/2003

(Continued)

OTHER PUBLICATIONS

Japanese Office Action dated Feb. 5, 2008 with English Translation.

Primary Examiner—Sinh Tran
Assistant Examiner—Christopher K Peterson
(74) Attorney, Agent, or Firm—McGinn IP Law Group, PLLC

(57) ABSTRACT

The image of a subject is attained by image sensing and the image of the subject is displayed on the display screen of a digital still camera. The image of a face is detected from within the image of the subject and a face frame is displayed so as to enclose the detected image of the face. Autofocus control and automatic exposure control is carried out using image data representing the image within the face frame. Image data representing the image of the subject in which the image of the face is in focus and has the appropriate brightness can be recorded on a memory card.

19 Claims, 13 Drawing Sheets

U.S. PATENT DOCUMENTS

| | | | |
|---|---|---|---|
| 2004/0208114 A1* | 10/2004 | Lao et al. | 369/125 |
| 2005/0105805 A1* | 5/2005 | Nicponski | 382/216 |
| 2005/0195154 A1* | 9/2005 | Robbins et al. | 345/156 |
| 2006/0139371 A1* | 6/2006 | Lavine et al. | 345/620 |

FOREIGN PATENT DOCUMENTS

| | | |
|---|---|---|
| JP | 2003-107567 | 4/2003 |
| JP | 2003-108979 | 4/2003 |
| JP | 2003-319169 | 11/2003 |
| JP | 2004-320287 | 11/2004 |

* cited by examiner

*Fig. 2*

| | FEATURE | VALUE | SCORE |
|---|---|---|---|
| 1 | PIXEL VALUE AT POSITION (x1,y1) IN SEARCH AREA | v_1 | p_1 |
| 2 | PIXEL VALUE AT POSITION (x2,y2) IN SEARCH AREA | v_2 | p_2 |
| : | : | : | : |
| i | PIXEL VALUE AT POSITION (x1,y1) IN SEARCH AREA IN CASE WHERE FILTER PROCESSING HAS BEEN APPLIED TO IMAGE IN SEARCH AREA | v_i | p_i |
| : | : | : | : |
| n | DIFFERENCE BETWEEN PIXEL VALUE AT POSITION (x1,y1) IN SEARCH AREA AND PIXEL VALUE AT POSITION (x2,y2) IN SEARCH AREA | v_n | p_n |

DIGITAL STILL CAMERA AND METHOD OF CONTROLLING SAME

BACKGROUND OF THE INVENTION

1. Field of the Invention

This invention relates to digital still camera (inclusive of an information device having the function of a digital still camera, an example of which is a mobile telephone equipped with a camera).

2. Description of the Related Art

In cases where the image of a subject is sensed using a digital still camera, the image of the subject is displayed on a display screen that is provided on the back of the digital still camera. The camera angle is decided while viewing the image of the subject displayed on the display screen.

If the image of a face appears in an image, the image of the face is recognized based upon face-recognition color data and the image of the face recognized is cut out of the image (see the specification of Japanese Patent Application Laid-Open No. 10-334213).

However, there is no prior art in which when the image of a face is contained in the image of a subject in a case where the image is sensed using a digital still camera, the part of the image that is the face is indicated to the user.

SUMMARY OF THE INVENTION

Accordingly, an object of the present invention is to so arrange it that a user can be made aware of the part of an image that is a face when the image is sensed.

According to the present invention, the foregoing object can be attained by providing a digital still camera comprising: an image sensing device for sensing the image of a subject and outputting image data representing the image of the subject; a display device for displaying the image of the subject, which is represented by the image data that has been output from the image sensing device, on a display screen; a face image detecting device (face image detecting means) for detecting a face image contained in the image of the subject represented by the image data that has been output from the image sensing device; a first display control device (first display control means) for controlling the display device in such a manner that a frame, which encloses the face image that has been detected by the face image detecting device, is displayed on the image of the subject; a shutter-release button; and a recording control device (recording control means) for recording the image data, which has been output from the image sensing device, on a recording medium in response to depression of the shutter-release button.

The present invention also provides a control method suited to the digital still camera described above. More specifically, the present invention provides a method of controlling a digital still camera, comprising the steps of: sensing the image of a subject and obtaining image data representing the image of the subject; displaying the image of the subject, which is represented by the image data that has been obtained by image sensing, on a display screen; detecting a face image contained in the image of the subject represented by the image data that has been obtained by image sensing; controlling the display device in such a manner that a frame, which encloses the face image that has been detected, is displayed on the image of the subject; and recording the image data, which has been obtained by image sensing, on a recording medium in response to depression of a shutter-release button.

In accordance with the present invention, the image of a subject is displayed on a display screen by sensing the image of the subject. A face image that is contained in the image of the subject is detected and a frame that encloses the detected face image is displayed on the image of the subject. If a shutter-release button is pressed, image data representing the image of the subject is recorded on a recording medium. In accordance with the present invention, a frame that encloses a face image is displayed and, as a result, the user can tell which part of the image of the subject should be centered on when the image is captured. Further, it is also possible to exercise control so as to focus the camera on the part of the image that is the face.

The image sensing device may include a solid-state image sensor for outputting image data representing the image of a subject, and a lens for forming the image of the subject on an image sensing surface of the solid-state image sensor. In this case, the digital still camera would further comprise an autofocus control device (autofocus control means) for controlling position the lens based upon the image data representing the image of the face within the frame. Thus the position of the lens can be controlled so as to focus the face image within the frame.

It may be so arranged that the digital still camera further comprises an automatic exposure control device (automatic exposure control means) for controlling exposure in the image sensing device based upon image data representing the image within the frame. Thus an image can be sensed in such a manner that amount of exposure of the image of a face within the frame will take on an appropriate value.

By scanning the image of the subject using a rectangular search area, for example, the face image detecting device detects that an image within this search area is a face image. In this case, the first display control device would display a frame, which corresponds to the search area, on the image of the subject. This makes it possible to prevent frames from overlapping each other in a case where the image of the subject contains a plurality of face images.

The digital still camera may further comprise an inclination detecting device (inclination detecting means) for detecting inclination of a face image that has been detected by the face image detecting device. In this case, the first display control device would display the frame, which corresponds to the search area, on the image of the subject in such a manner that the frame is inclined at an angle that conforms to the inclination of the face image detected by the inclination detecting device. In a case where the image of a face is cut out, this facilitates the cutting operation. Further, it will be understood that even an inclined face image is detected comparatively accurately.

It may be so arranged that the digital still camera further comprises a trimming command device for applying a trimming command; and a second display control device (second display control means), which is responsive to application of the trimming command from the trimming command device, for controlling the display device so as to cut out an image portion, which includes the image within the frame and is parallel to the image within the frame and corresponds to an aspect ratio of the display screen, and display this image portion on the display screen upon rotating the image portion in accordance with the inclination.

In a case where a face image within the frame is displayed, the face image can be viewed with ease. In addition, even in a case where a face image within the frame is displayed on the display screen upon being rotated as the center, areas in which no image data exists can be eliminated and it is possible to prevent the displayed image from becoming difficult to view.

By scanning the image of the subject using a rectangular search area, for example, the face image detecting device detects that an image within this search area is a face image. In this case, the first display control device would display a frame, which corresponds to the search area, on the image of the subject. Further, the digital still camera would further comprise a trimming command device for applying a trimming command; and a second display control device (second display control means), which is responsive to application of the trimming command from the trimming command device, for controlling the display device so as to cut an image portion, which includes the image within the frame and is parallel to the image within the frame and corresponds to an aspect ratio of the display screen of the display device, and display this cut image portion on the display screen.

In this case also areas in which no image data exists can be eliminated even in an instance where a face image within the frame is displayed on the display screen upon being rotated as the center, and it is possible to prevent the displayed image from becoming difficult to view.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a table indicating an example of results of learning;

DESCRIPTION OF THE PREFERRED EMBODIMENT

A preferred embodiment of the present invention will now be described in detail with reference to the drawings.

A digital still camera according to this embodiment is capable of displaying a frame around the image of a face if the image of the face appears in the image of a subject obtained by image sensing. By exercising autofocus control and automatic exposure control, etc., using image data representing the image within the frame, there is obtained the image of a subject in which the part of the image that is the face appears in high definition.

Figure 1:
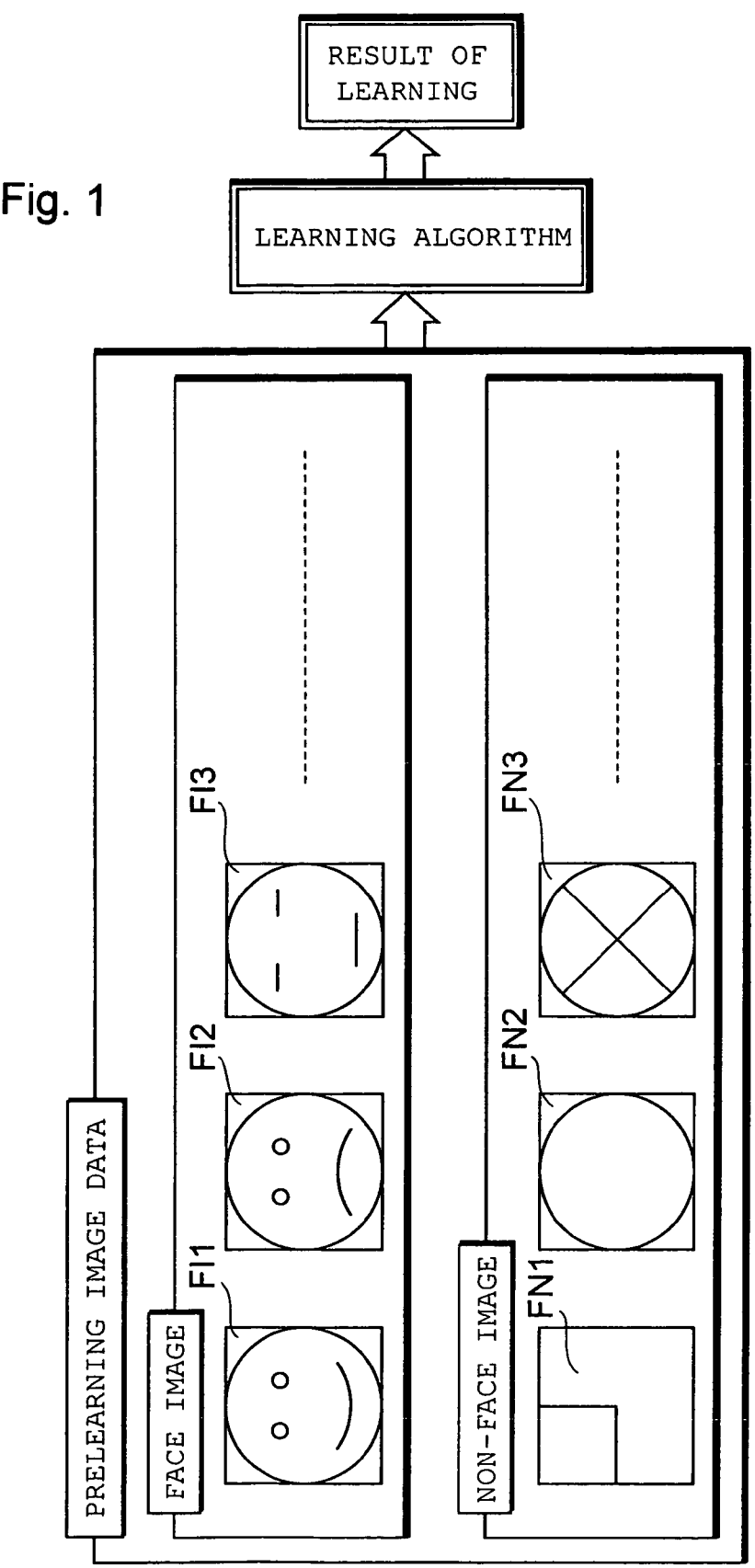
FIG. 1 illustrates the manner in which results of learning are created.

FIG. 1 illustrates the manner in which result of learning (detection data) utilized in the detection of a face image is generated in this embodiment.

Face image data and non-face image data is used as prelearning image data. Data representing images FI1, FI2, FI3, etc. of various faces is used for the face image data. Data representing non-face images, namely images that are not faces (which may be images that do or do not resemble the images of faces) FN1, FN2, FN3, etc., is used for the non-face image data.

Result of learning for determining whether an image is a face image or not is obtained in accordance with a prescribed learning algorithm using these items of prelearning image data. The obtained result of learning is stored in the digital still camera.

FIG. 2 illustrates an example of a table representing result of learning.

Result of learning has been stored as pixel values at prescribed positions within a search area, pixel values or the differences between pixel values at prescribed positions within the search area in a case where filter processing has been applied to an image within the search area, and the scores of these values. A corresponding score (which may be positive or negative) is obtained from a value such as a certain pixel value, and a value obtained by accumulating the obtained scores becomes an evaluation value indicative of the facial likeliness of an image within the search area.

Figure 3:
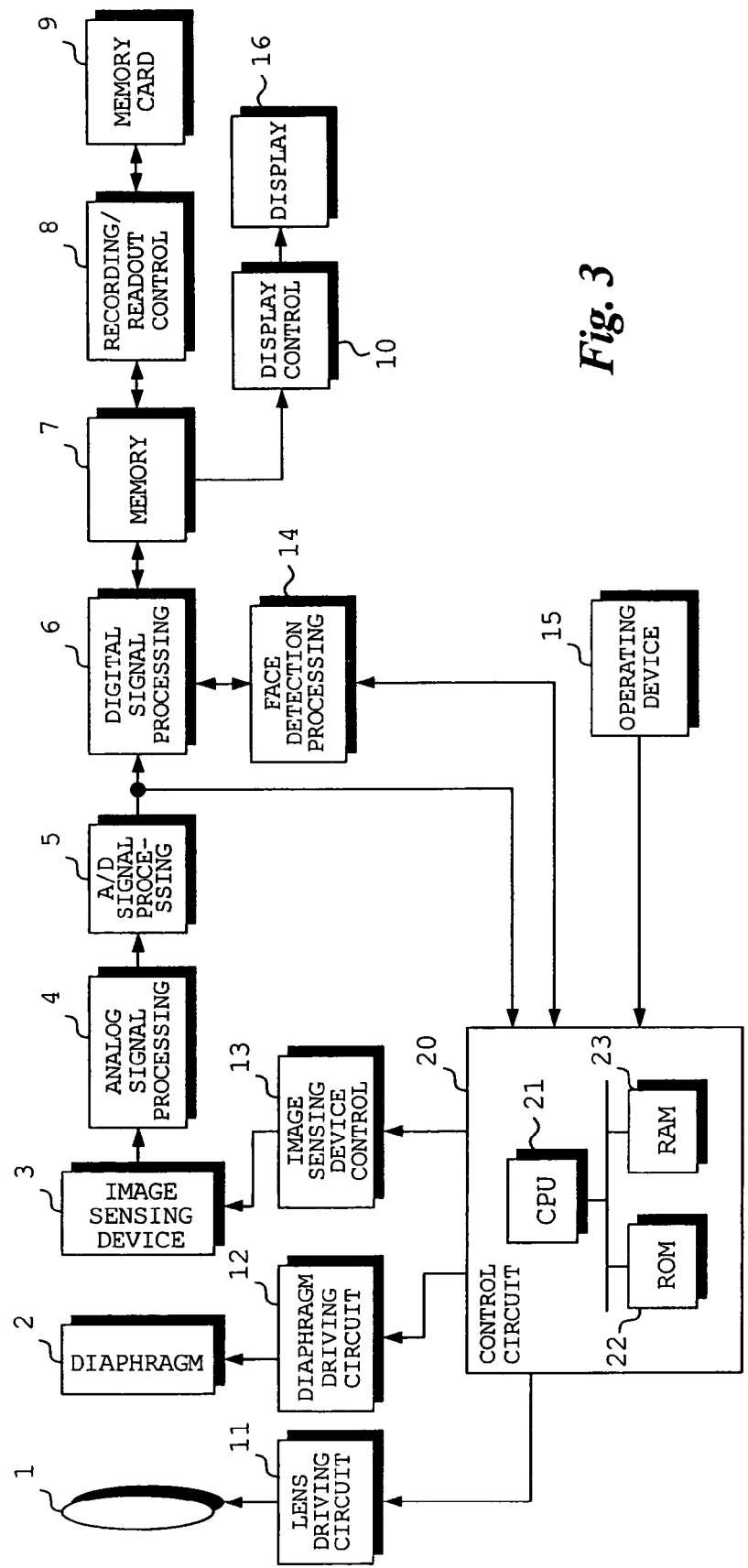
FIG. 3 is a block diagram illustrating the electrical structure of a digital still camera.

FIG. 3 is a block diagram illustrating the electrical structure of a digital still camera.

The overall operation of the digital still camera is controlled by a control circuit 20.

The control circuit 20 includes a CPU 21, a ROM 22 and a RAM 23 interconnected by a bus. Data representing result of learning as described above has been stored in the ROM 22. It goes without saying that template image data representing the image of a face may be stored in the ROM 22 rather than result of learning having the form of a table or the like as described above. The RAM 23 stores image data representing the image within the search area, as well as other image data.

The digital still camera includes an operating device 15 having a two-stroke shutter-release button, a mode setting dial, an OK button and a trimming button, etc. An operating signal that is output from the operating device 15 is input to the control circuit 20.

The zoom position of a zoom lens 1 is controlled by a lens driving circuit 11. The aperture of a diaphragm 2 is controlled by a diaphragm driving circuit 12. A light beam representing the image of a subject is condensed by the lens 1 and impinges upon an image sensing device 3 such as a CCD through the diaphragm 2. A light image representing the image of the subject is formed on the photoreceptor surface of the image sensing device 3.

If an image sensing mode is set by a mode setting dial, the image sensing device 3 is controlled by a control circuit 13 for the image sensing device 3, which outputs a video signal representing the image of the subject. The video signal is subjected to analog signal processing such as correlated double sampling in an analog signal processing circuit 4. The video signal that is output from the analog signal processing circuit 4 is converted to digital image data in analog/digital signal processing circuit 5 and the digital image data is input to the control circuit 20 and to a digital signal processing circuit 6. Digital signal processing such as a gamma correction and white balance adjustment is executed in the digital signal processing circuit 6.

The image data that has been output from the digital signal processing circuit 6 is applied to a display control circuit 10 via a memory 7. The image of the subject is displayed on the display screen of a display unit 16 by the display control circuit 10.

The digital still camera according to this embodiment is capable of detecting the image of a face that is contained in the image of a subject. As described above, therefore, the image data that is output from the digital signal processing circuit 6 is input to a face detecting circuit 14 as well. The face detecting circuit 14 detects the image of a face within the image of a subject and applies data, which represents the position and size of the image of the face, to the control circuit 20 and digital signal processing circuit 6.

When the data representing the position, etc., of the face is applied to the digital signal processing circuit 6, the latter generates data representing a face frame (frame) that encloses the position of the face. Data representing the face frame is applied to the display control circuit 10 via the memory 7. The face frame is displayed on the image of the subject on the display screen of a display unit 16 in such a manner that the frame encloses the face image of the image of the subject.

If the shutter-release button is pressed through the first part of its stroke, image data that has been output from the analog/digital signal processing circuit 5 is applied to the control circuit 20 as well. Under the control of the control circuit 20, the lens position of the lens 1 is controlled (for autofocus control) by the lens driving circuit 11 using the entered image data in such a manner that the image of the subject will be brought into focus. Further, the diaphragm 2 is controlled by the diaphragm driving circuit 12 and the shutter speed of the image sensing device 3 is controlled by the control circuit 13 for the image sensing device 3 in such a manner that the image of the subject will undergo the proper amount of exposure (automatic exposure control).

This autofocus control and automatic exposure control may be performed using image data within the face frame or without using this image data, as well be described later in greater detail.

If the shutter-release button is pressed through the second part of its stroke, the image of the subject is sensed again and data representing the image of the subject is obtained in a manner similar to that described above. The image data is applied from the digital signal processing circuit 6 to the memory 7, where the data is stored temporarily. The image data is read out of the memory 7 and is recorded on a memory card 9 by a recording/readout control circuit 8. It goes without saying that data compression may applied as necessary.

If a playback mode is set by the mode setting dial, image data representing the image of the subject is read out of the memory card 9 by the recording/readout control circuit 8. The image data that has been read out is input to the digital signal processing circuit 6 through the memory 7. The digital signal processing circuit 6 executes data expansion processing as necessary. Image data is output from the digital signal processing circuit 6 and applied to the display control circuit 10 via the memory 7. An image represented by the image data that has been read out of the memory card 9 is displayed on the display screen of the display unit 16.

Figure 4:
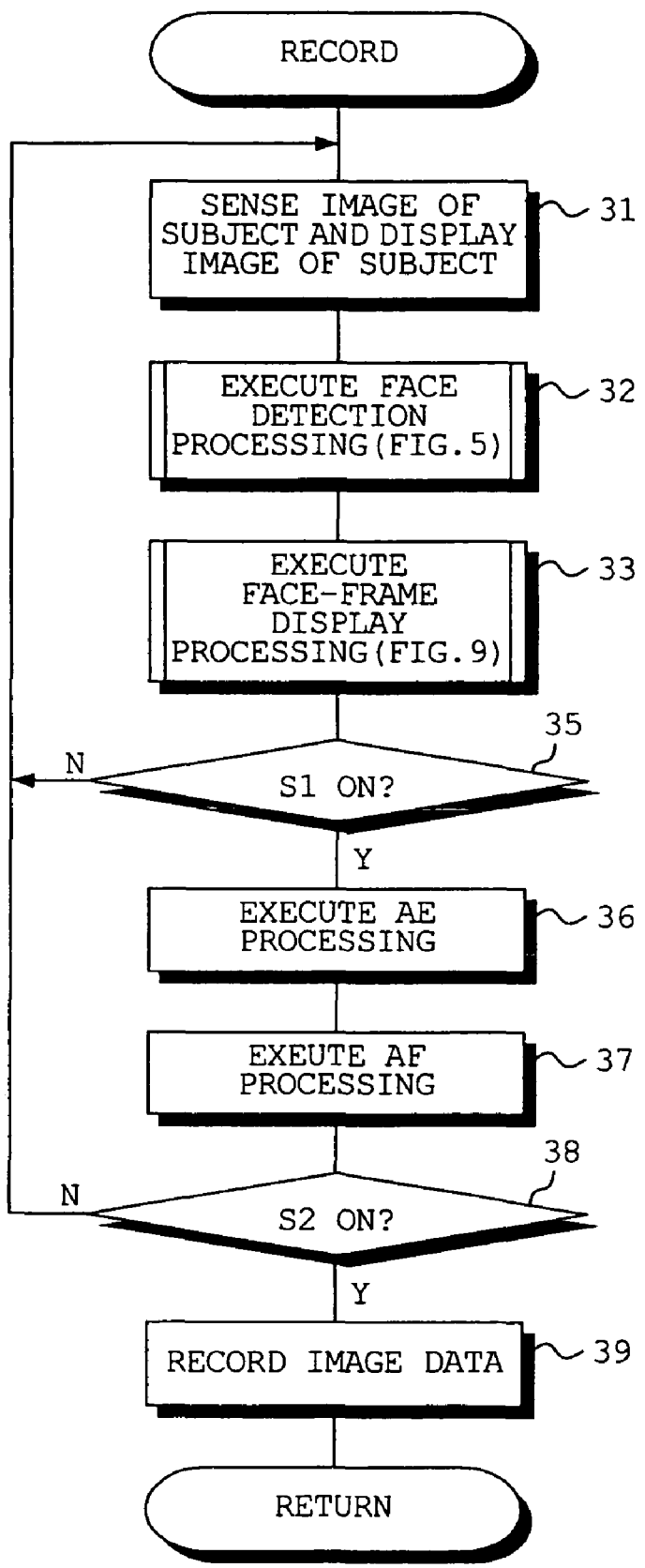
FIG. 4 is a flowchart illustrating recording processing.

FIG. 4 is a flowchart illustrating processing executed when recording is performed by the digital still camera according to this embodiment.

If the image sensing mode is set, the image of the subject is sensed and image data representing the image of the subject is obtained (step 31) in the manner described above. The image of the subject is displayed on the display screen of the display unit 16 by applying the obtained image data to the display unit 16. The image data representing the image of the subject is also applied to the face detecting circuit 14, whereby processing for detecting the image of a face contained in the image of the subject is executed (step 32). When face detection processing is executed, processing for displaying a face frame that encloses the image of a face in the image of the subject is executed (step 33). The details of this face detection processing and face-frame display processing will be described later.

If the shutter-release button is pressed through the first half of its stroke ("YES" at step 35), then automatic exposure control (step 36) and autofocus control (step 37) is executed using image data representing the image within the face frame from the image data that has been output from the analog/digital signal processing circuit 5, as described above. Since the image within the face frame is the image of a face, automatic exposure control and autofocus control is performed to bring the image of the face into focus and obtain the proper brightness for this image.

If the shutter-release button is pressed through the second half of its stroke ("YES" at step 38), then image data representing the entirety of the image of the subject obtained by image sensing is recorded on the memory card 9 (step 39).

Figure 5:
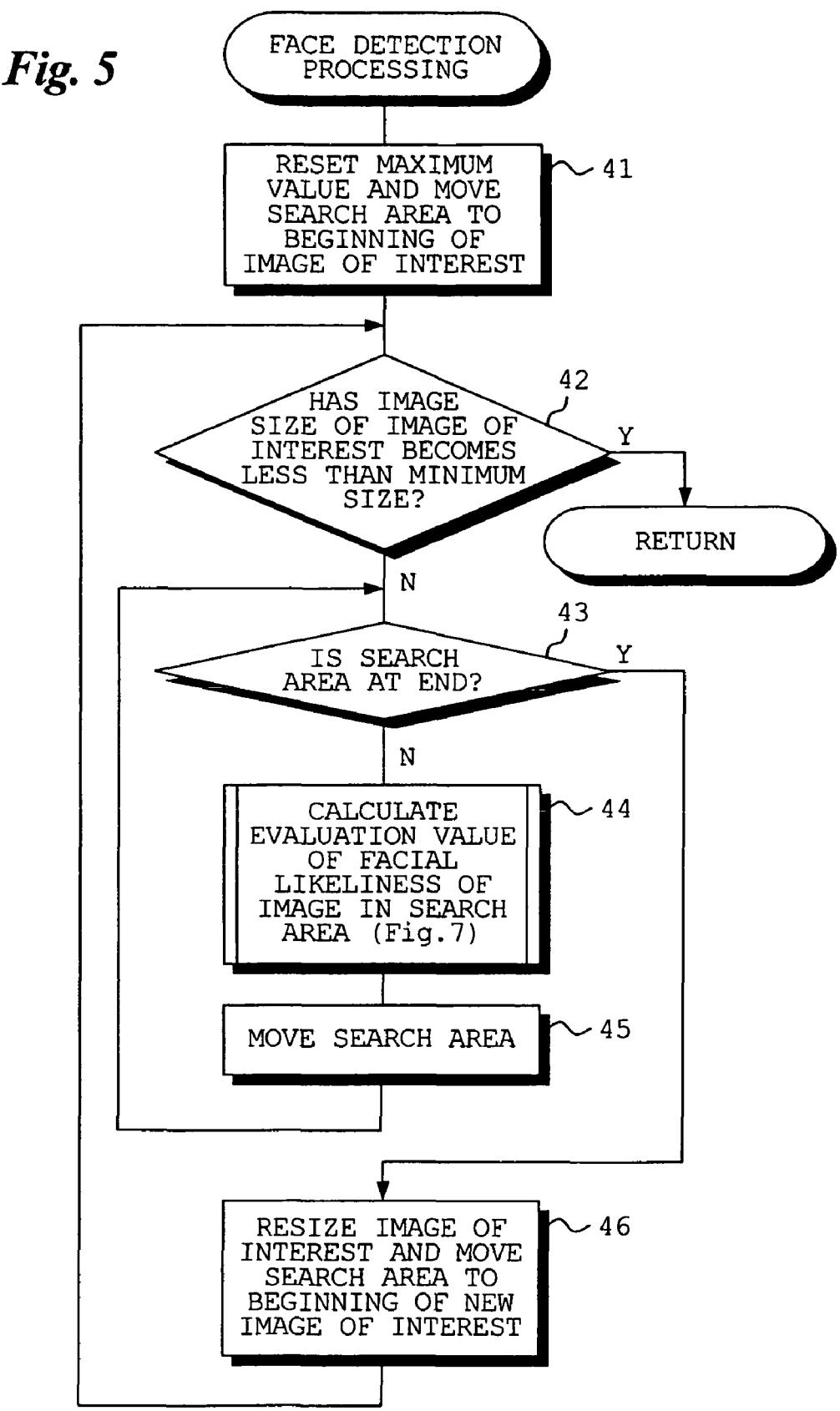
FIG. 5 is a flowchart illustrating face detection processing.
Figure 6:
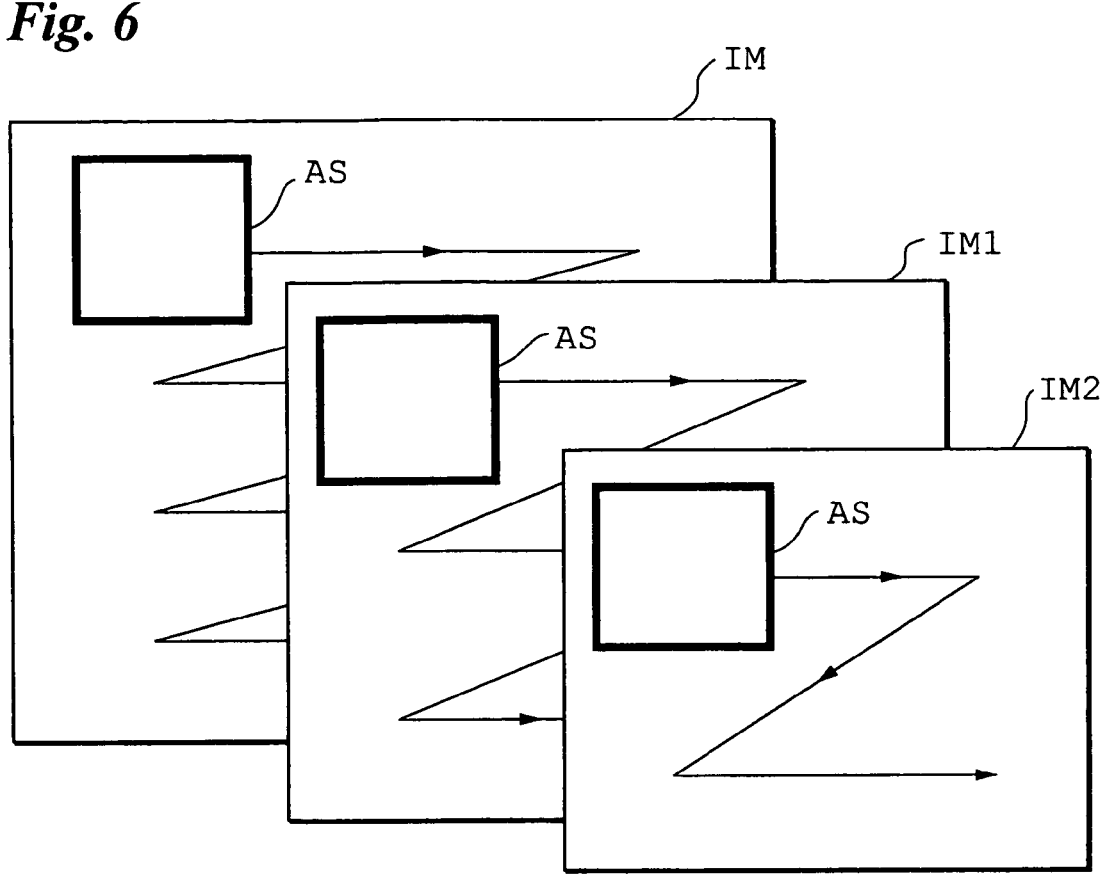
FIG. 6 illustrates the manner in which the image of a subject is searched using a search area.

FIG. 5 is a flowchart illustrating processing for detecting a face image (the processing of step 32 in FIG. 4), and FIG. 6 illustrates the relationship between the image of a subject and a search area.

This processing causes the image of the subject obtained by image sensing to be scanned by the search area and evaluates the degree of matching between the image within the search area and the above-mentioned result of learning (detection data). Further, as will be described later, the image within the search area is rotated in prescribed angular increments and processing for calculating an evaluation value is executed also at each prescribed angle through which the image has been rotated incrementally. The image of a portion specified as by the position, etc., of the search area for which the maximum evaluation value has been obtained is judged to be the image of a face.

First, the maximum value of the evaluation value is set to zero (step 41). Further, a search area AS is moved to the beginning of a subject image IM (step 42). In this embodiment, the size of the subject image becomes gradually smaller and the subject image diminishes to a prescribed minimum image size. An evaluation value of facial likeliness is calculated with regard to the image within the search area AS at each size. It is determined, therefore, whether the image size of the subject image has become the prescribed minimum image size (step 42).

If the minimum image size has been attained ("YES" at step 42), processing for calculating the evaluation value will have been executed at various sizes and therefore the position of the image of the face in the subject image is decided based upon the maximum evaluation value obtained and a transition is made to processing for displaying the face frame. If the minimum image size has not been reached ("NO" at step 42), then it is determined whether the search area is at the end of the subject image IM (step 43).

If the search area AS is at the end of the subject image IM ("YES" at step 43), evaluation value calculation processing regarding the image of interest will have ended. Processing for resizing the subject image IM is executed, therefore, in such a manner that evaluation value calculation processing will be executed with regard to an image of interest of the next smaller size (step 44). Further, the search area AS is moved to the beginning of the subject image that has been resized. If the search area AS is not at the end of the subject image IM ("NO" at step 43), then an evaluation value indicating the facial likeliness of the image within the search area AS is calculated (step 44). The details of processing for calculating the evaluation value will be described later. When processing for calculating the evaluation value ends, the search area is moved a small distance in the horizontal and vertical directions (step 45). The processing of steps 43 and 44 is repeated.

Thus, when processing for calculating an evaluation value of facial likeliness regarding the image within the search area AS ends with regard to the subject image IM, evaluation value calculation processing is repeated until the image size reaches the minimum image size, as by applying this processing to subject image IM1 of smaller size and to subject image IM2 of still smaller size.

Figure 7:
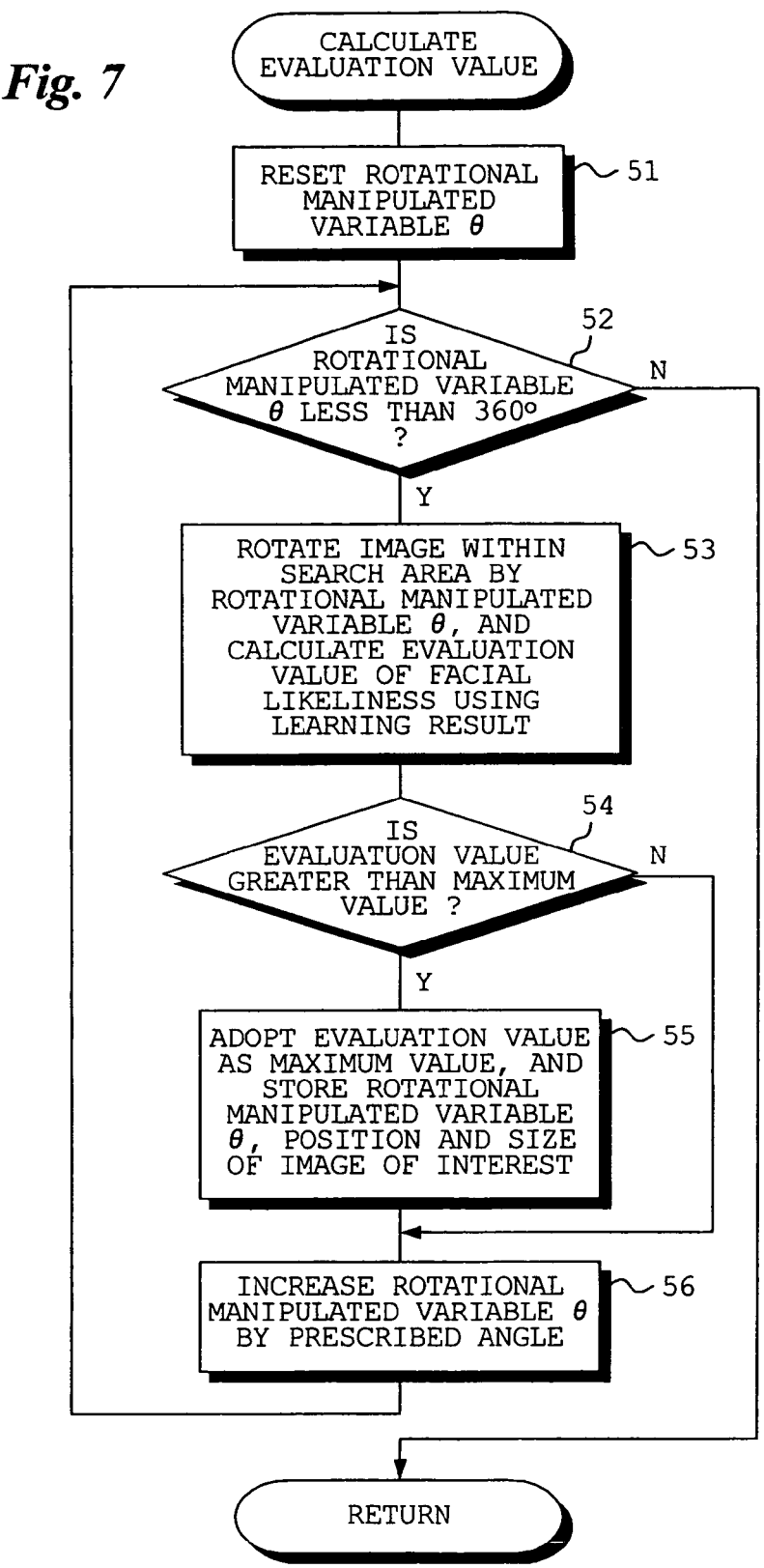
FIG. 7 is a flowchart illustrating processing for calculating an evaluation value.

FIG. 7 is a flowchart illustrating processing for calculating an evaluation value (the processing at step 44 in FIG. 5).

In this processing, the image in search area AS is rotated counter-clockwise at increments of 15° about the center of the search area AS and an evaluation value indicating the extent to which the image is face-like is calculated using the result of learning regarding the rotated image within the search area AS.

First, a rotational manipulated variable θ indicating angle of rotation of the image within the search area AS is reset to zero (step 51). When the rotational manipulated variable θ reaches 360°, the image within the search area AS will have made one complete revolution. When the rotational manipulated variable θ becomes equal to or greater 360°, therefore ("NO" at step 52), then processing for calculating the evaluation value at this position of the search area AS ends. If the manipulated variable θ is less than 360° ("YES" at step 52), then the image within the search area AS is rotated by the rotational manipulated variable θ (where counter-clockwise is taken as being the positive direction) and the evaluation value of the image within the search area AS is calculated using the result of learning (step 53).

If the obtained evaluation value is larger than the maximum value ("YES" at step 54), then this evaluation value is adopted anew as the maximum value and the rotational manipulated variable θ, the position of the search area and the size information of the image of interest are stored (step 55). If the obtained evaluation value is not larger than the maximum value ("NO" at step 54), then the processing of step 54 is skipped. The manipulated variable θ is increased by 15° (step 56) and the image within the search area AS is rotated through the angle specified by the increased manipulated variable θ. Processing for calculating the evaluation value is repeated in similar fashion using the result of learning regarding the rotated image within the search area AS.

Thus, the rotational manipulated variable θ is increased in increments of 15°, the evaluation value of facial likeliness is calculated with regard to the image, which has been rotated incrementally by the manipulated variable θ (i.e., through 15°, 30°, 45°, . . . ), within the search area AS, and the maximum value among these obtained evaluation values is stored. As mentioned above, processing for calculating the evaluation value is executed with regard to all areas of many images of interest of different sizes and the manipulated variable θ that affords the largest evaluation value is stored.

Figure 8:
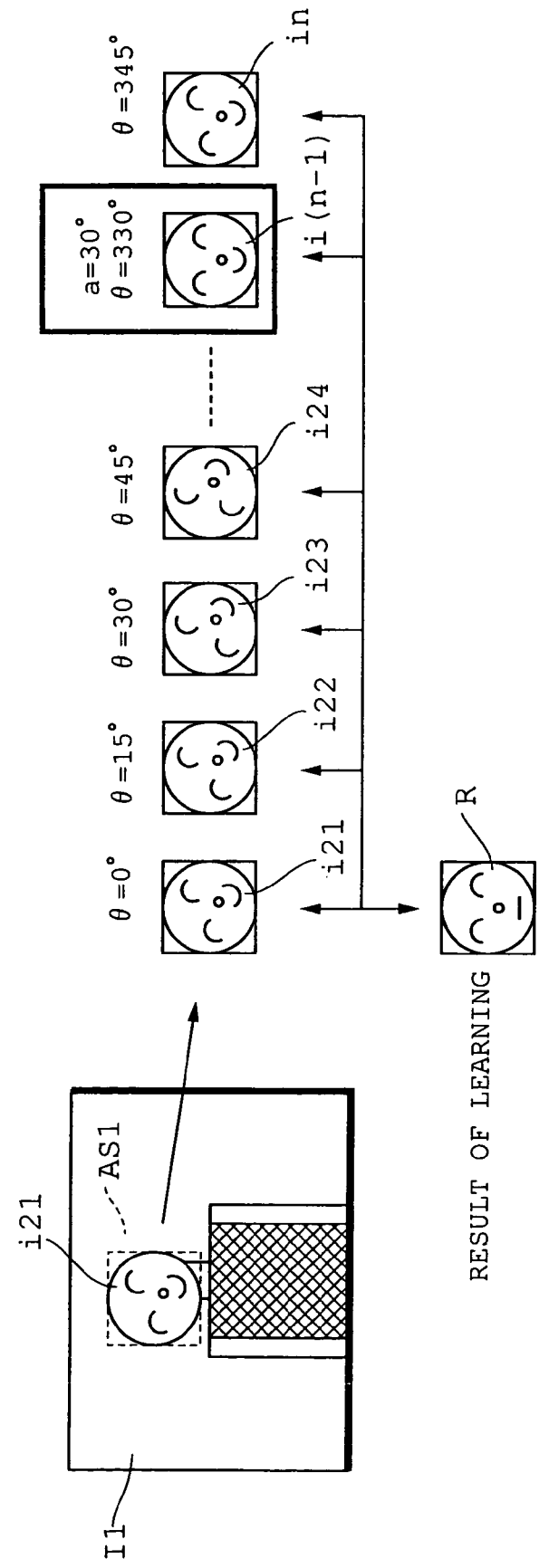
FIG. 8 illustrates an image rotated in a search area and result of learning.

FIG. 8 illustrates the image within the search area and result of learning for detecting facial likeliness.

An image i21 within search area AS1 contained in subject image I1 is inclined 30° to the left (i.e., in the counter-clockwise direction).

Use is made of result of learning to calculate facial likeliness with regard to images i21 to i2n obtained in a case where the rotational manipulated variable θ of the image i21 within the search area AS2 has been rotated from 0 to 345° in increments of 15°. The image i21 has a leftward inclination of 30°. In a case where the result of learning is used, therefore, the evaluation value of facial likeliness with respect to image i21 that prevails when the rotational manipulated variable θ is 330° takes on the maximum value. The manipulated variable θ of 330° is stored together with the position of the search area AS1.

Since the manipulated variable θ is 330°, inclination angle α of the image within the search area AS1 is calculated according to the formula α=360°−θ (inclination angle α=360°−330°=30°). As will be described later, a face frame that has a leftward inclination of 30° can be displayed on the image of the subject.

Figure 9:
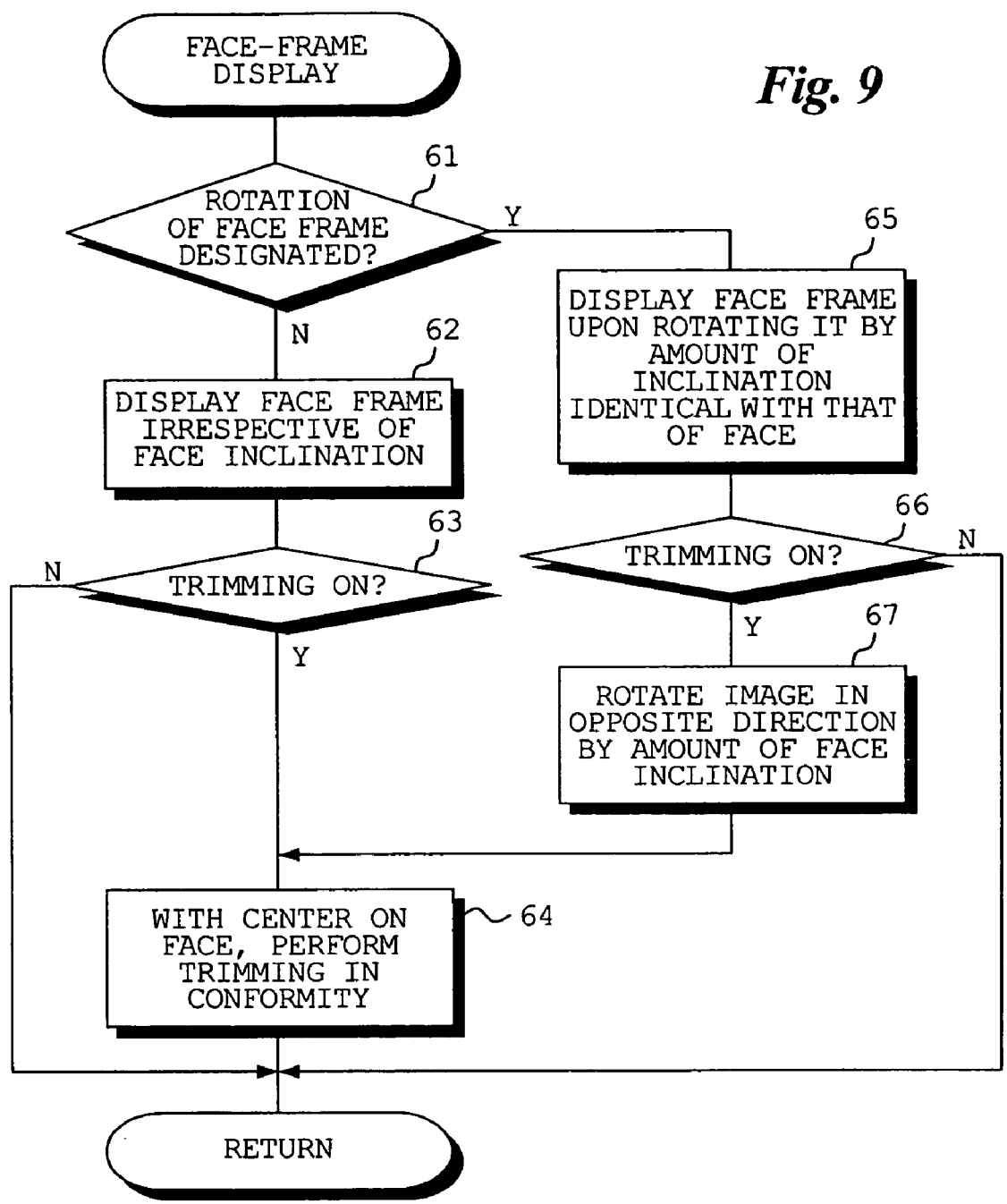
FIG. 9 is a flowchart illustrating processing for displaying a face frame.

FIG. 9 is a flowchart illustrating processing for displaying a face frame (the processing at step 33 in FIG. 4), and FIGS. 10 to 13 illustrate an example of the image of a subject displayed on the display screen of the display unit 16.

First, whether display of the face frame following the rotation thereof has been designated is determined (step 61). This designation is made beforehand in a setup mode that is set by the mode setting dial.

Figure 10:
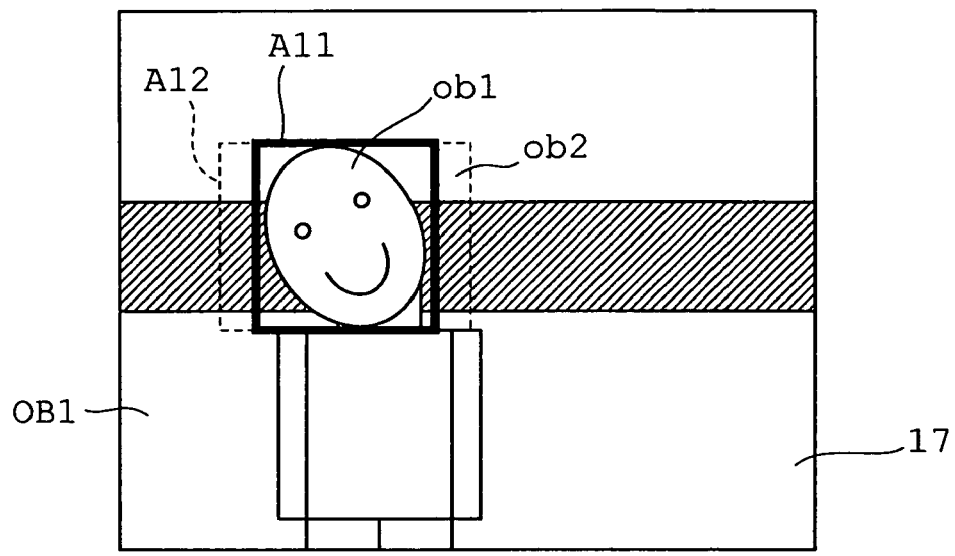
FIG. 10 illustrates an example of the image of a subject displayed on a display screen.

If display of the face frame following the rotation thereof has not been designated ("NO" at step 61), then the face frame is displayed on the image of the subject in an attitude parallel to the display screen irrespective of inclination of the image of the face detected (step 62). FIG. 10 illustrates an example in which a face frame is displayed on the image of the subject in an attitude parallel to the display screen irrespective of inclination of the image of the face.

With reference to FIG. 10, when the image of the subject is sensed, the subject image OB1 is displayed on a display screen 17 of the display unit 16, as described above. Face detection processing is such that if an image portion ob1 of the face is detected, a face frame (which corresponds to the search area as mentioned above) A11 is displayed parallel to the display screen 17 so as to enclose the image portion ob1 of this face.

With reference again to FIG. 9, if the trimming button is pressed ("YES" at step 63), a trimming frame A12 (see FIG. 10), which has an aspect ratio corresponding to the aspect ratio of the display screen 17 and includes the face frame A11, is set. The image within the set trimming frame A12 is cut from the subject image OB1 and image enlargement processing is executed in such a manner that the image ob2 within the trimming frame A12 is displayed over the entire display screen 17 (step 64).

Figure 11:
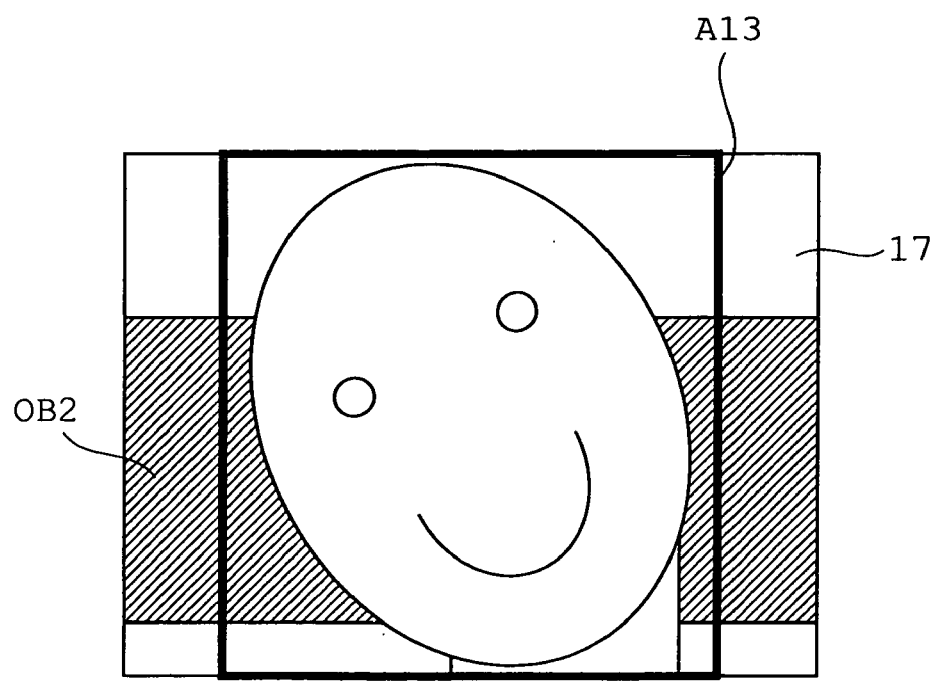
FIG. 11 illustrates an image obtained by enlarging the image of a detected face.

With reference now to FIG. 11, an image OB2 obtained by enlarging the image ob2 within the trimming frame A12 is displayed over the entire display screen 17. An enlarged face frame A13 also is being displayed on the enlarged image OB2. As mentioned above, autofocus control processing and automatic exposure control processing is executed using the image data representing the image within the face frame A13 (A12). The user is capable of checking that autofocus control is carried out so as to bring the image of the face within the face frame A13 (A12) into focus and that automatic exposure control has been carried out so as to properly expose the image of the face. When a fixed period of time elapses, the display of the image OB2 shown in FIG. 11 returns to the display of image OB1 shown in FIG. 10. If the trimming button is not pressed ("NO" at step 63), then the processing of step 64 is skipped.

In a case where a designation has been made to display the face frame upon rotating it ("YES" at step 61), the face frame is inclined by amount of inclination that corresponds to the inclination of the face of the image detected in the manner described above and is displayed on the image of the subject so as to enclose the image of the face (step 65). An example in which the face frame is displayed upon being inclined is illustrated in FIG. 12.

Figure 12:
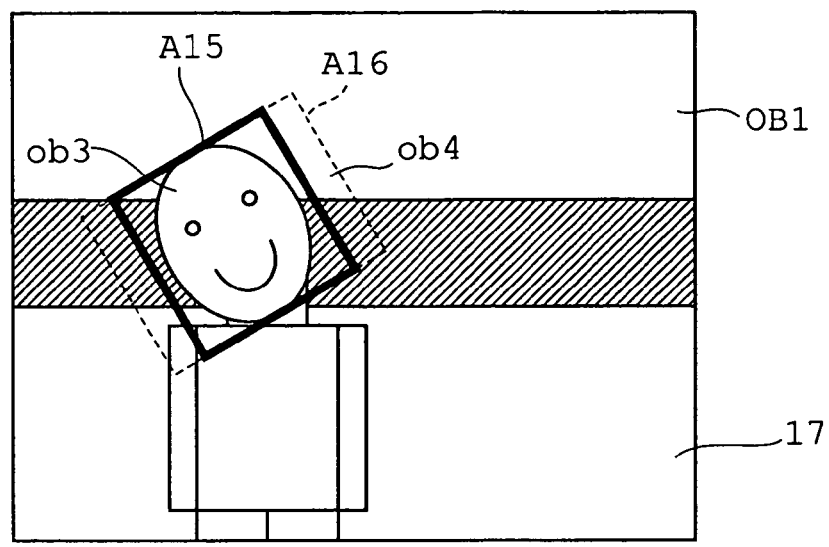
FIG. 12 illustrates an example of the image of a subject displayed on a display screen.

With reference to FIG. 12, the subject image OB1 is displayed on the display screen 17 of the display unit 16 when the image of the subject is sensed, as described above. In face detection processing, the portion of the image that is the face is detected and an image portion ob3 that is the face is enclosed by a face frame A15 having an inclination that conforms to the inclination of the detected portion of the image that is the face.

With reference again to FIG. 9, if the trimming button is pressed ("YES" at step 66), then the face image portion ob3 enclosed by the face frame A15 is rotated by the amount of inclination of the image of the face in the direction opposite this inclination (step 67). Image enlargement processing is executed in such a manner that an image ob4 within a trimming frame A16 having an aspect ratio corresponding to the aspect ratio of the display screen 17 and including the face frame 15 is displayed over the entire display screen 17 (step 64).

Figure 13:
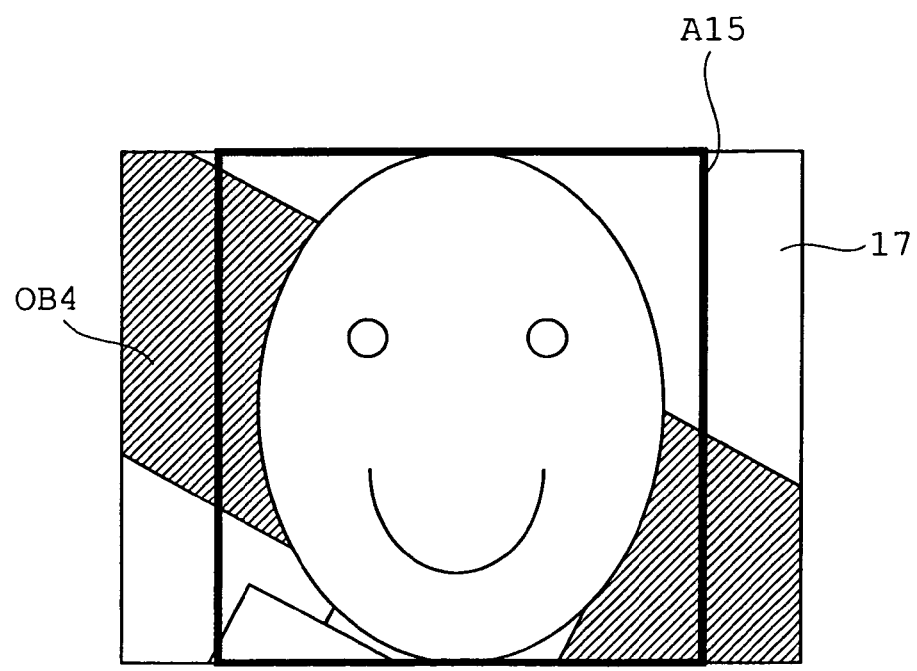
FIG. 13 illustrates an image obtained by enlarging the image of a detected face.

With reference now to FIG. 13, an image OB4 that is the result of enlarging the image ob4 within the trimming frame A16 is displayed over the entire display screen 17. The enlarged face frame A15 also is being displayed on the enlarged image OB4. Thus the orientation of the image of the face is corrected even in a case where the face of the subject is inclined.

Figure 14:
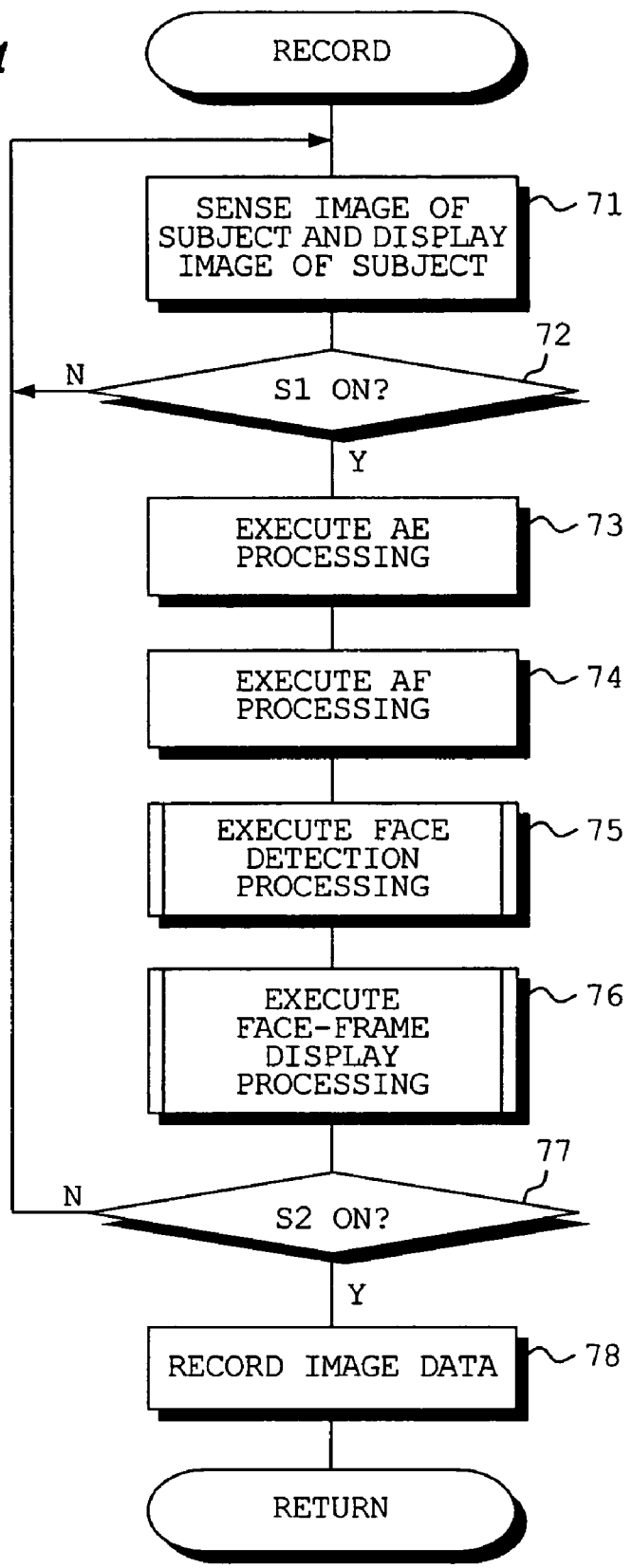
FIGS. 14 and 15 are flowcharts illustrating recording processing.

FIG. 14 is a flowchart illustrating another example of recording processing.

In the record processing illustrated in FIG. 4, autofocus control processing and automatic exposure control processing is executed using image data within a face frame displayed upon execution of face detection processing. In the processing illustrated in FIG. 14, however, autofocus control processing and automatic exposure control processing is executed using image data representing the image of a subject prior to the execution of face detection processing. Face detection processing is applied to the image of a subject that has undergone autofocus control processing and automatic exposure control processing, and a face frame is displayed. Whether or not the image within the face frame is in focus and whether or not it is properly exposed can be checked by referring to the face frame.

If the image sensing mode is set, the image of the subject is sensed and the image of the subject is displayed on the display screen of the display unit 16 (step 71). If the shutter-release button is pressed through the first half of its stroke ("YES" at step 72), then automatic exposure control processing (step 73) and autofocus control processing (step 74) is executed using image data representing the image of the subject.

Further, face detection processing is executed (step 75) in the manner described above, and this is followed by execution of processing for displaying the face frame (step 76). Since the face frame is displayed, whether or not the image within the face frame is in focus and whether or not it is properly exposed can be checked, as set forth above.

If the shutter-release button is pressed through the second half of its stroke ("YES" at step 77), then image data representing the entirety of the image of the subject obtained by image sensing is recorded on the memory card (step 78).

Figure 15:
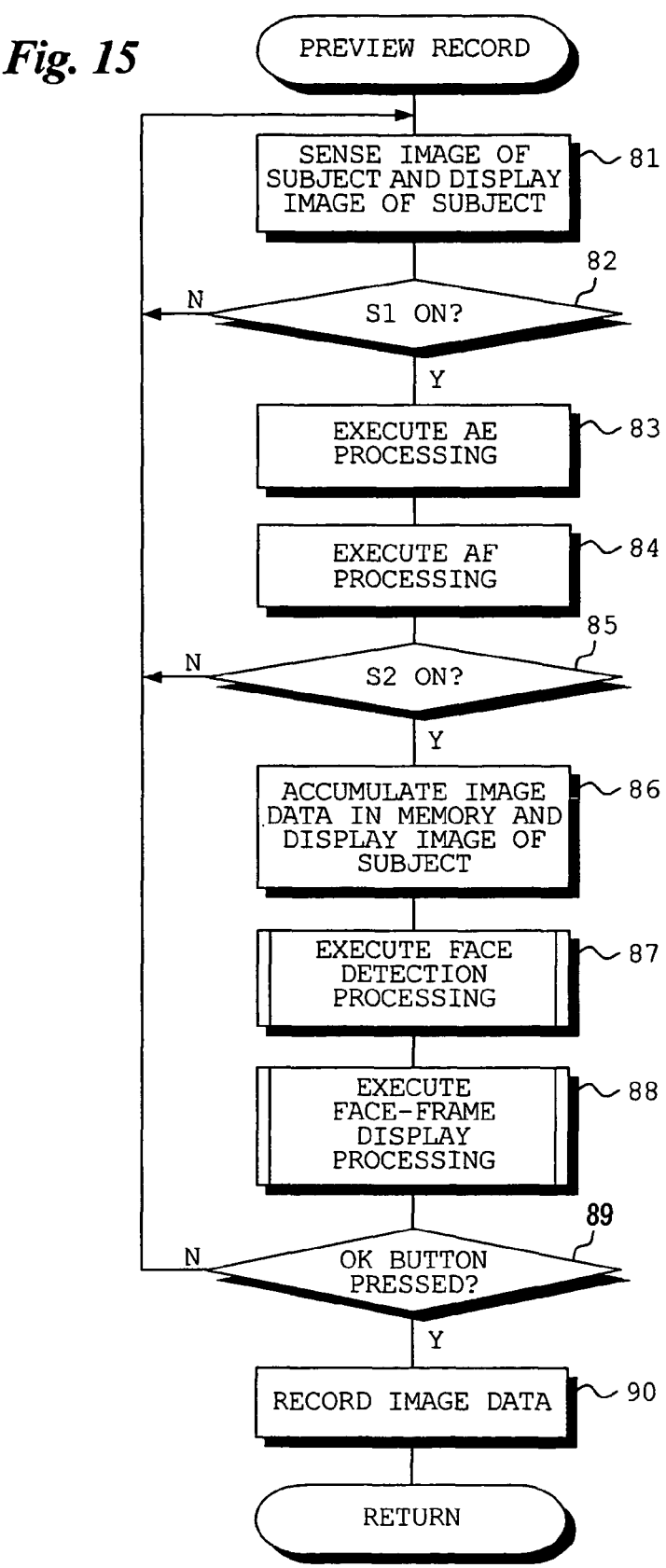

FIG. 15 is a flowchart illustrating another example of recording processing. This flowchart illustrates processing for preview recording.

In the case of preview recording, image data is stored in the memory 7 temporarily before it is recorded on a memory card. The image of the subject represented by this stored image data is displayed and face detection processing and processing for displaying the face frame is executed. The image within the face frame or the image of the subject is displayed on the display screen as set forth above. When confirmation as to whether or not the image within the face frame is in focus and as to whether or not the image is properly focused is performed, the OK button is pressed and the image data representing the image of the subject is recorded on the memory card.

If the image sensing mode is set, the image of the subject is sensed and the image of the subject is displayed on the display screen of the display unit 16 (step 81). If the shutter-release button is pressed through the first half of its stroke ("YES" at step 82), then automatic exposure control processing (step 83) and autofocus control processing (step 84) is executed.

If the shutter-release button is pressed through the second half of its stroke ("YES" at step 85), then image data obtained by image sensing is recorded temporarily on the memory 7 (step 87). The image data is read from the memory 7 and the image of the subject represented by the read image data is displayed on the display screen of the display unit 16.

Further, face detection processing is executed (step 87) and processing for displaying the face frame is executed (step 88). The user views the image of the subject or the image within the face frame displayed on the display screen and, if the image data representing the overall image of the subject is to be recorded on the memory card, the user presses the OK button ("YES" at step 89). If this is done, the image data that has been stored temporarily in the memory 7 is applied to and recorded on the memory card 16. If a fixed period of time elapses without depression of the OK button, the image data that has been stored temporarily in the memory 7 is erased.

In the embodiment described above, a face image that is inclined is detected by rotating the image within the search area and making a comparison with results of learning. However, it may be so arranged that an inclined face image is detected using a learning result, which makes it possible to detect an image that is the result of rotating the image within the search area, instead of rotating the image per se within the search area (i.e., it is as if the learning result is rotated instead of the image itself).

As many apparently widely different embodiments of the present invention can be made without departing from the spirit and scope thereof, it is to be understood that the invention is not limited to the specific embodiments thereof except as defined in the appended claims.

What is claimed is:

1. A digital still camera, comprising:
   an image sensing device for sensing an image of a subject and outputting image data representing the image of the subject;
   a display unit for displaying the image of the subject, which is represented by the image data that has been output from said image sensing device, on a display screen;
   a face image detecting device for detecting a face image contained in the image of the subject represented by the image data that has been output from said image sensing device;
   a first display control device for controlling said display unit in such a manner that a face frame, which encloses the face image that has been detected by said face image detecting device, and a trimming frame having an aspect ratio corresponding to an aspect ratio of the display screen and including the face frame, are displayed on the image of the subject;
   a second display control device for controlling the display unit in such a manner that an image that is a result of enlarging an image within the trimming frame is displayed over an entirety of the display screen;

a shutter-release button; and a recording control device for recording the image data, which has been output from said image sensing device, on a recording medium in response to a depression of said shutter-release button, wherein the face image detecting device resizes the image of the subject to gradually smaller sizes, wherein the face image detecting device detects the face image by using a rectangular search area to scan each of the resized images of the subject, wherein a frame corresponds to the rectangular search area and said frame is displayed on the image of the subject, wherein a face image that is inclined is detected by rotating the face image within the rectangular search area and making a comparison with results of prelearning image data, wherein, if the face image detected by said face image detecting device is inclined, then the face image is rotated by an amount of an inclination of the face image in a direction opposite the inclination of the face image, and wherein the face frame has a different aspect ratio than the aspect of the display screen.

2. The digital still camera according to claim 1, wherein said image sensing device comprises:

a solid-state image sensor for outputting image data representing the image of the subject; and a lens for forming the image of the subject on an image sensing surface of said solid-state image sensor, said digital still camera further comprising an autofocus control device for controlling a position of said lens based upon the image data representing the face image within the frame.

3. The digital still camera according to claim 1, further comprising an automatic exposure control device for controlling exposure in said image sensing device based upon image data representing the image within the frame.

4. The digital still camera according to claim 1, further comprising an inclination detecting device for detecting the inclination of the face image that has been detected by said face image detecting device, wherein said first display control device displays the frame, which corresponds to the rectangular search area, on the image of the subject in such a manner that the frame is inclined at an angle that conforms to the inclination of the face image detected by said inclination detecting device.

5. The digital still camera according to claim 1, further comprising:

a trimming command device for applying a trimming command; and a second display control device, which is responsive to an application of the trimming command from said trimming command device, for controlling said display device so as to cut out an image portion, which includes the image within the frame and is parallel to the image within the frame and corresponds to an aspect ratio of the display screen of said display device, and display this image portion on the display screen.

6. The digital still camera according to claim 1, wherein the face image detecting device resizes the image of the subject to gradually smaller sizes until a minimum size is reached.

7. The digital still camera according to claim 6, wherein when a resized image of the minimum size has been reached, the first display control device displays the frame on the image of the subject.

8. The digital still camera according to claim 1, wherein for the scan of each of the resized images of the subject, the rectangular search area is moved to a beginning of the resized image of the subject.

9. The digital still camera according to claim 1, wherein during a scanning, the rectangular search area is moved horizontally and vertically with respect to each of the resized images of the subject.

10. The digital still camera according to claim 1, wherein when the rectangular search area reaches an end of the resized image of the subject, another gradually smaller image of the subject is produced.

11. The digital still camera according to claim 1, wherein a size of the rectangular search area remains static throughout the face detection process.

12. A method of controlling a digital still camera, comprising:

sensing an image of a subject and obtaining image data representing the image of the subject;

displaying the image of the subject, which is represented by the image data that has been obtained by image sensing, on a display screen;

resizing the image of the subject to gradually smaller sizes;

detecting a face image contained in the image of the subject represented by the image data that has been obtained by image sensing by using a rectangular search area to scan each of the resized images of the subject;

controlling the display device in such a manner that a face frame, which encloses the face image that has been detected, and a trimming frame having an aspect ratio corresponding to an aspect ratio of the display screen and including the face frame are displayed on the image of the subject;

controlling further the display device in such a manner that an image that is a result of enlarging an image within the trimming frame is displayed over an entirety of the display screen; and recording the image data, which has been obtained by image sensing, on a recording medium in response to a depression of a shutter-release button, wherein the frame corresponds to the rectangular search area, wherein a face image that is inclined is detected by rotating the face image within the rectangular search area and making a comparison with results of prelearning image data, wherein, if the face image detected in said detecting the face image is inclined, then the face image is rotated by an amount of an inclination of the face image in a direction opposite the inclination of the face image, and wherein the face frame has a different aspect ratio of the display screen.

13. The method of controlling a digital still camera according to claim 12, further comprising detecting the inclination of the face image by a face image detecting device, wherein said first display control device displays the frame, which corresponds to the rectangular search area, on the image of the subject in such a manner that the frame is inclined at an angle that conforms to the inclination of the face image detected by said inclination detecting device.

14. The method of controlling a digital still camera according to claim 12, further comprising resizing the image of the subject to gradually smaller sizes until a minimum size is reached.

15. The method of controlling a digital still camera according to claim 14, further comprising displaying the frame on the image of the subject when a resized image of the minimum size has been reached.

16. The method of controlling a digital still camera according to claim 12, wherein the detecting includes moving the rectangular search area to a beginning of the resized image of the subject.

17. The method of controlling a digital still camera according to claim 12. wherein the detecting includes moving the rectangular search area horizontally and vertically with respect to each of the resized images of the subject.

18. The method of controlling a digital still camera according to claim 12, further comprising producing another gradually smaller image of the subject when the rectangular search area reaches an end of the resized image of the subject.

19. The method of controlling a digital still camera according to claim 12, wherein a size of the rectangular search area remains static throughout the face detection process.

* * * * *